United States Patent
Cutler et al.

(10) Patent No.: US 9,449,301 B2
(45) Date of Patent: Sep. 20, 2016

(54) MANAGED OBJECT SUPPORT

(75) Inventors: Kevin Cutler, Carp (CA); Katha Kulasingam, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1723 days.

(21) Appl. No.: 12/776,069

(22) Filed: May 7, 2010

(65) Prior Publication Data

US 2011/0276530 A1 Nov. 10, 2011

(51) Int. Cl.
*G06Q 10/06* (2012.01)
*H04L 12/14* (2006.01)
*G06Q 10/10* (2012.01)

(52) U.S. Cl.
CPC .............. *G06Q 10/10* (2013.01); *G06Q 10/06* (2013.01); *H04L 12/14* (2013.01); *H04L 12/1403* (2013.01)

(58) Field of Classification Search
CPC ........ G06Q 10/10; H04L 12/12; H04L 12/14
USPC ......................................... 709/228; 370/252
See application file for complete search history.

(56) References Cited

U.S. PATENT DOCUMENTS

| | | | |
|---|---|---|---|
| 6,502,131 B1 * | 12/2002 | Vaid | H04L 1/1854 709/224 |
| 7,437,449 B1 * | 10/2008 | Monga | H04L 12/24 370/230 |
| 7,957,314 B2 * | 6/2011 | Andreasen et al. | 370/252 |
| 8,140,624 B2 * | 3/2012 | Gingell | G06F 8/61 709/201 |
| 2007/0168919 A1 * | 7/2007 | Henseler | G06F 8/61 717/101 |
| 2011/0314145 A1 * | 12/2011 | Raleigh | H04L 41/0893 709/224 |

* cited by examiner

*Primary Examiner* — Asghar Bilgrami
(74) *Attorney, Agent, or Firm* — Kramer & Amado, P.C.

(57) ABSTRACT

Various exemplary embodiments relate to a method and related network node including one or more of the following: determining, at a policy and charging rules node, that the policy and charging rules node should perform a policy decision; comparing a criteria portion of at least one rule of a plurality of rules to a set of context information; identifying a rule of the plurality of rules that matches the set of context information; determining that a result portion of the identified rule includes a reference to a first managed object; and using the first managed object as at least part of a result of the policy decision.

20 Claims, 4 Drawing Sheets

MANAGED OBJECT SUPPORT

TECHNICAL FIELD

Various exemplary embodiments disclosed herein relate generally to policy and charging in telecommunications networks.

BACKGROUND

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an aa-request (AAR) message or from a packet data network gateway (PGW) in the form of a credit control request (CCR) message. The standards specify that the PCRF is responsible for receiving requests, establishing IP-CAN and gateway control sessions, creating new policy and charging control (PCC) rules commensurate with such requests, and providing these new PCC rules to the PCEF for installation. The 3GPP standards also define the format of various messages and PCC rules.

The 3GPP standards do not, however, describe how the PCRF should interpret a request, establish sessions, or create PCC rules. Such functionality is desired for the operation of the EPC. Without an infrastructure to establish various sessions or create appropriate PCC rules based on a request, the EPC may not be able to provide service to user equipment, charge subscribers for application usage, or ensure that a certain QoE level is met in providing services. Indeed, the 3GPP standards fall short of describing how the PCRF should process and respond to the various possible messages that may be sent by an SGW, PGW, or AF.

In view of the foregoing, it would be desirable to provide a flexible method of processing messages received at a PCRF. In particular, it would be desirable to provide a customizable process by which a PCRF may receive a message from another node and take appropriate action in response.

SUMMARY

In light of the present need for a flexible method of processing messages received at a policy and charging rules node (PCRN), a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method, related network node, and related machine-readable storage medium including one or more of the following: determining, at a policy and charging rules node, that the policy and charging rules node should perform a policy decision; comparing a criteria portion of at least one rule of a plurality of rules to a set of context information; identifying a rule of the plurality of rules that matches the set of context information; determining that a result portion of the identified rule includes a reference to a first managed object; and using the first managed object as at least part of a result of the policy decision.

Various alternative embodiments relate to a policy and charging rules node including one or more of the following: a rules storage configured to store a plurality of rules, wherein each rule includes a first portion and a second portion; a managed object storage configured to store at least one managed object; an interface configured to receive a message; a message handler configured to: determine that a policy decision should be generated, and use a result of the policy decision to process the message; a rule matching engine configured to: compare the first portion of at least one rule of the plurality of rules with a set of context information, and identify a rule from among the plurality of rules that matches the set of context information; and a result interpreter configured to: determine that the second portion of the rule includes a reference to a managed object of the at least one managed object, and indicate that the policy decision includes the managed object.

It should be apparent that, in this manner, various exemplary embodiments provide for a flexible method of processing messages received at a PCRN. Particularly, by providing managed object support, a user may define managed objects to be used in determining the behavior of a PCRN. Thereafter, managed objects may be modified to easily update the outcome of numerous rules which refer to the managed objects.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
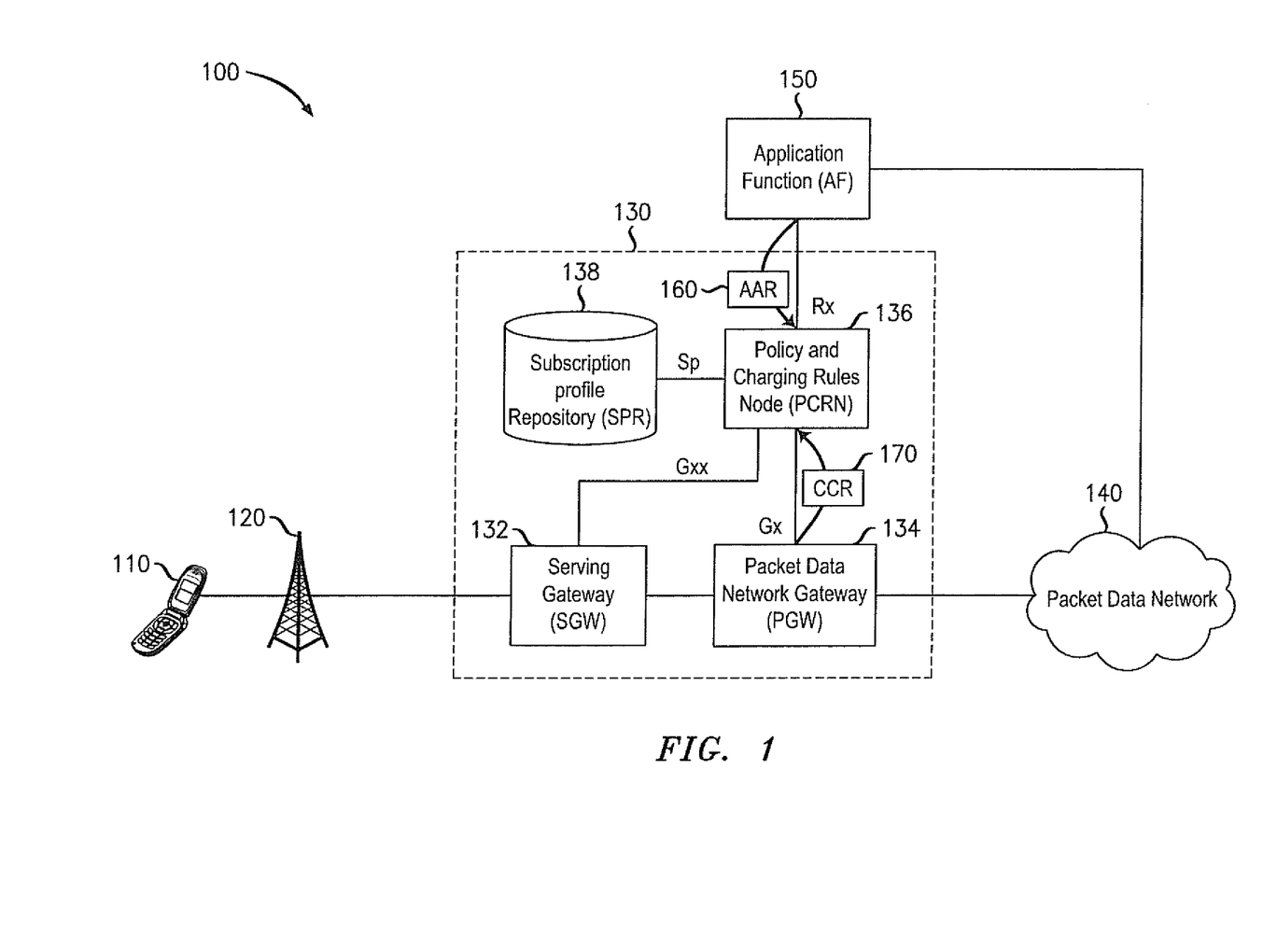
FIG. 1 illustrates an exemplary subscriber network for providing various data services.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130 to an end user of network 100. SGW 132 may be the first device within the EPC 130 that receives packets sent by user equipment 110.

SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP standard (PMIP), SGW 132 may include a bearer binding and event reporting function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW may construct a credit control request (CCR), such as CCR 170, requesting an appropriate allocation of resources and forward the request to PCRN 136.

It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an aa-request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive a request in the form of a credit control request (CCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

In processing various requests, PCRN 136 may make use of a managed object the details of which will be described below with reference to FIGS. 2-6. Such a managed object may be predefined by a manufacturer or a user to provide values for relevant variables in various situations. For example, as will be described in further detail below with reference to FIG. 4, a managed object may provide values for a QoS class identifier (QCI), maximum allowed bandwidth, and charging parameters in some situations related to PCC rule creation. A managed object may additionally or alternatively indicate what action the PCRN 136 should take in various situations such as, for example, ignoring or processing a particular request.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as subscriber category, bandwidth limits, charging parameters, and subscriber priority.

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an aa-request (AAR) 160 according to the Diameter protocol, to notify the PCRN 136 that resources should be allocated for the application service. This application request message may include information such as an identification of a subscriber using the application service and an identification of service data flows that are desired to be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-6.

PCRN 136 may receive a request for establishment of a service data flow such as, for example, AAR 160 and/or CCR 170. PCRN 136 may then determine that a managed object is applicable to the request based on the context of the request. For example, a subscription category of the requesting user may be used to determine that a particular managed object is to be used. In generating a PCC rule for providing the service data flow, PCRN 136 may use values provided by the applicable managed object. For example, as indicated by an applicable managed object, PCRN 136 may use a QCI of 6 and a charging rate of $0.10 per kilobyte of transfer in the new PCC rule.

Figure 2:
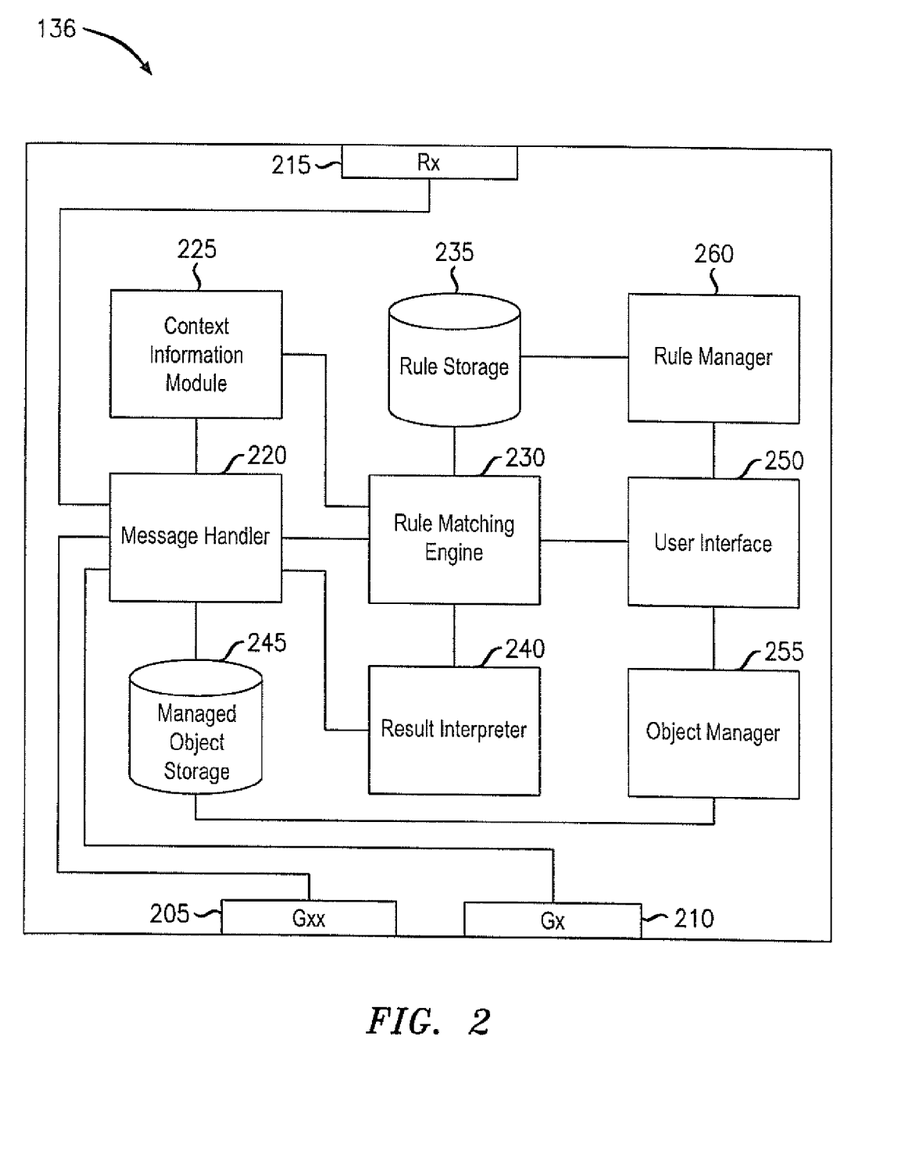
FIG. 2 illustrates an exemplary policy and charging rules node (PCRN) for providing managed object support.

FIG. 2 illustrates an exemplary policy and charging rules node (PCRN) 136 for providing managed object support. PCRN 136 may correspond to PCRN 136 of exemplary subscriber network 100. PCRN 136 may include a Gxx interface 205, a Gx interface 210, an Rx interface 215, a message handler 220, a context information module 225, a rule matching engine 230, a rule storage 235, a result interpreter 240, a managed object storage 245, a user interface 250, an object manager 255, and a rule manager 260.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated application and session requests in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated application and session requests in the form of a CCR.

Rx interface 215 may be an interface comprising hardware and/or executable instructions encoded on a machine-readable storage medium configured to communicate with an AF such as AF 150. Such communication may be implemented according to the 3GPP TS 29.214. For example, Rx interface 215 may receive application and service requests in the form of an AAR.

Message handler 220 may include hardware and/or executable instructions on a machine-readable storage medium configured to process application requests, session requests, event notifications, and other messages received via Gxx interface 205, GX interface 210, and Rx interface 215. For example, message handler 220 may create and install new PCC rules in response to an application request. As a further example, message handler 220 may establish, modify, or terminate IP-CAN sessions and gateway control sessions in response to a session request. After fully processing a message, message handler may construct and transmit a message over Gxx interface 205, GX interface 210, and/or Rx interface 215 to notify other nodes as to the result of processing the message. For example, if message handler 220 creates a new PCC rule in response to a message, it may construct a reauthorization request (RAR) message to push the new PCC rule to an appropriate PGW.

In processing various messages, message handler 220 may request a policy decision from rule matching engine 230 and base at least part of its response to the message on the policy decision results. Message handler 220 may provide context information from the message to rule matching engine 230, either directly or via context information module 225. Policy decision results may include a reference to a managed object, in which case message handler 220 may refer to the managed object storage 245 in order to process the message.

Context information module 225 may include hardware and/or executable instructions on a machine-readable storage medium configured to provide various context information to rule matching engine 230. For example, context information module 225 may store information carried by a received message. Context information module 225 may further store previously received and/or transmitted messages associated with a subscriber, session, and/or service data flow. Context information module 225 may further access information stored elsewhere such as, for example, subscriber information stored in an SPR such as SPR 138.

Rule matching engine 230 may include hardware and/or executable instructions on a machine-readable storage medium configured to identify rules stored in rule storage 235 that are applicable to a received message. As will be described in further detail below with respect to FIG. 3, each rule may include a criteria section which indicates when a rule is applicable. Rule matching engine 230 may compare this criteria section to context information passed to it by message handler 220 and/or retrieved from context information module 225. Upon locating an applicable rule, message handler may pass the rule to result interpreter 240. In various embodiments, rule matching engine 230 may stop attempting to match rules at this point, while in other embodiments, rule matching engine may continue to search for additional applicable rules.

Rule storage 235 may be any machine-readable medium capable of storing policy decision rules for use by rule matching engine 230. Accordingly, rule storage 235 may include a machine-readable storage medium such as read-only memory (ROM), random-access memory (RAM), magnetic disk storage media, optical storage media, flash-memory devices, and/or similar storage media. In various alternative embodiments, rule storage 235 may be a device that is external to PCRN 136. As will be described in further detail below with respect to FIG. 3, rule storage 235 may store definitions of numerous policy decision rules. Such definitions may include, for example, a criteria section and a result section.

Result interpreter 240 may include hardware and/or executable instructions on a machine-readable storage medium configured to interpret a result section of a rule passed by rule matching engine 230. Result interpreter 240 may compile the results indicated by the result section of one or more rules into a policy decision result and subsequently pass the policy decision result to message handler 220. Some result sections may include a reference to a managed object. In various embodiments, result interpreter 240 may retrieve a referenced managed object from managed object storage 245 and incorporate its contents into the policy decision result. In various alternative embodiments, result interpreter 240 may instead simply include the reference to the managed object in the policy decision result and the message handler 220 may retrieve the managed object.

Managed object storage 245 may be any machine-readable medium capable of storing managed objects for use by result interpreter 240 and/or message handler 220. Accordingly, managed object storage 245 may include a machine-readable storage medium such as read-only memory (ROM), random-access memory (RAM), magnetic disk storage media, optical storage media, flash-memory devices, and/or similar storage media. Managed object storage 245 may be an independent storage device or may be the same as rule storage 235. In various alternative embodiments, managed object storage 245 may be a device that is external to PCRN 136. As will be described in further detail below with respect to FIG. 4, managed object storage 245 may store definitions of numerous managed objects. Such definitions may include, for example, a name and values for at least one variable.

User interface 250 may include hardware and/or executable instructions on a machine-readable storage medium configured to provide a user with access to PCRN 136. User interface 250 may receive input from a user and may include hardware such as, for example, a keyboard and/or mouse. User interface 250 may also display information as output to the user and may include, for example, a monitor. A user may access object manager 255 and/or rule manager 260 via user interface 250.

Object manager 255 may include hardware and/or executable instructions on a machine-readable storage medium configured to define, modify, and otherwise manage managed objects. For example, object manager 255 may receive a definition of a new managed object via user interface 250, format the definition according to a standard managed object syntax used by PCRN 136, and store the definition in managed object storage 245. Object manager 255 may further provide a definition of an existing managed object to a user upon request via user interface 250. Object manager 255 may subsequently receive a modified object definition, format the definition if necessary, and store the definition in managed object storage 245. In storing a modified definition, object manager 255 may overwrite an existing definition or store the modified definition as a new version of the managed object while preserving the old definition. Thus, object manager 255 may provide version control functionality.

Rule manager 260 may include hardware and/or executable instructions on a machine-readable storage medium configured to define, modify, and otherwise manage policy decision rules. For example, rule manager 260 may receive a definition of a new policy decision rule via user interface 250, format the definition according to a standard policy decision rule syntax used by PCRN 136, and store the definition in rule storage 235. Rule manager 260 may further provide a definition of an existing policy decision rule to a user upon request via user interface 250. Rule manager 260 may subsequently receive a modified rule definition, format the definition if necessary, and store the definition in rule storage 235. In storing a modified definition, rule manager 260 may overwrite an existing definition or store the modified definition as a new version of the policy decision rule while preserving the old definition. Thus, rule manager 260 may provide version control functionality.

In various embodiments, managed objects may additionally or alternatively be used to define criteria for use in the criteria section of a rule. The modifications to PCRN 136 for providing such functionality will be apparent to those of ordinary skill in the art. For example, rule matching engine 230 may be configured to access managed object storage 245 in order to evaluate criteria stored in a managed object.

Figure 3:
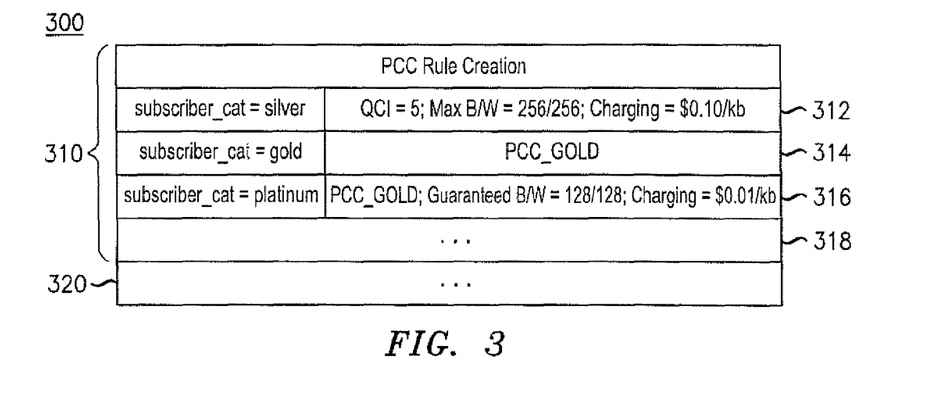
FIG. 3 illustrates an exemplary data arrangement for storing policy decision rules in the embodiment shown in FIG. 2.

FIG. 3 illustrates an exemplary data arrangement 300 for storing policy decision rules. Data arrangement 300 may be, for example, a table in a database stored in rule storage 235 (FIG. 2), SPR 138 (FIG. 1), or another node (not shown) within EPC 130 (FIG. 1). Alternatively, data arrangement 300 could be a series of linked lists, an array, or a similar data structure. Thus, it will be understood that data arrangement 300 is an abstraction of the underlying data; any data structure suitable for storage of the underlying data may be used.

Data arrangement 300 may include various rule sets for use in policy decisions related to processing various types of messages, event notifications, and in other contexts where a policy decision may be useful, as recognized by a person of ordinary skill in the art. For example, rule set 310 may be used when a policy decision is being performed in relation to the creation of a new PCC rule. Data arrangement 300 may include numerous additional rule sets 320 for other contexts such as, for example, Gx session establishment, Gx session modification, Gx session termination, Gxx session establishment, Gxx session modification, Gxx session termination, Rx session establishment, Rx session modification, and Rx session termination. Rule sets 320 may also include rule sets for various mapping tables such as a table for mapping a media type to an appropriate QCI.

Each rule set may include a number of rules. For example, rule set 310 may include rules 312, 314, 316 and additional rules 318. For brevity, only some of the rules (e.g., rules 312, 314, 316) are shown in FIG. 3. It will be understood that other rules may be included in a rule set of data arrangement 300. Each rule may include a criteria section for use in determining whether a rule is applicable and a result section that indicates values for at least one variable and/or an action to take when a rule is to be applied. Each criteria section may include one or more conditions that identify the rule as applicable when they evaluate to "true." In various alternative embodiments, a criteria section may also include a reference to a managed object (not shown) which may define one or more conditions for use as criteria. Likewise, each result section may include one or more values to be used in specified variables and/or references to managed objects.

As an example, rule 312 indicates that it is applicable when a subscriber category is "silver." Rule 312 further indicates that, when it is applicable, the QCI for the new rule should be "5", the maximum bandwidth should be 256 kb in both directions, and the charging parameter should be $0.10 per kilobyte transferred.

Policy decision rules may also include references to managed objects instead of, or in addition to, specifically defined values. For example, rule 314 indicates that when the subscriber category is "gold," the managed object identified as "PCC_GOLD" is applicable. As will be described in further detail below with respect to FIG. 4, the "PCC_GOLD" managed object may define values for at least one variable, to be used as at least part of a policy decision result.

Managed objects may be referenced by multiple rules, as illustrated by rule 316. Rule 316 indicates that when the subscriber category is "platinum," the "PCC_GOLD" managed object should be used in generating the policy decision result. The result section may include references to multiple managed objects or, in the case of rule 316, additional variable values to be used. Thus, in addition the contents of the PCC_GOLD object, the policy decision result may include and indication that a guaranteed bandwidth of 128 kb in both directions should be used.

A result section may include conflicting results. For example, rule 316 would include an internal conflict if, as will be seen below with reference to FIG. 4, the PCC_GOLD object specifies a charging parameter of $0.05 per kilobyte of transfer while the rule 316 definition also gives a later charging parameter of $0.01 per kilobyte of transfer. In some embodiments, the first provided value may be used and subsequently provided values may be ignored, while in other embodiments, further provided values may be used to override previously provided values. Thus, in some embodiments, rule 316 may indicate that the charging parameter of $0.05 per kilobyte is to be used, while in other embodiments rule 316 may indicate that the charging parameter of $0.01 per kilobyte is to be used.

Figure 4:
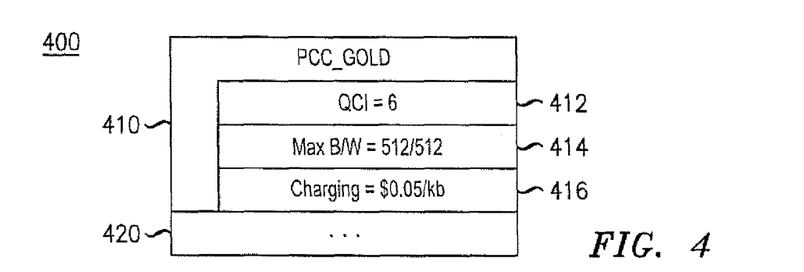
FIG. 4 illustrates an exemplary data arrangement for storing managed objects in the embodiment shown in FIG. 2.

FIG. 4 illustrates an exemplary data arrangement 400 for storing managed objects. Data arrangement 400 may be, for example, a table in a database stored in managed object storage 245 (FIG. 2), SPR 138 (FIG. 1), or in another node (not shown) of EPC 130 (FIG. 1). Alternatively, data arrangement 400 could be a series of linked lists, an array, or a similar data structure. Thus, it should be apparent that data arrangement 400 is an abstraction of the underlying data; any data structure suitable for storage of the underlying data may be used.

Data arrangement 400 may include a managed object 410 and additional managed objects 420. In various embodiments, managed objects 410, 420 may be organized within managed object sets (not shown) similar to the rule sets 310, 320 used in data arrangement 300 (FIG. 3). In such embodiments, rules within a particular rule set can reference those managed objects within the corresponding managed object set. In other embodiments, data arrangement 400 may not include managed object sets, and any rule can reference any managed object, regardless of the rule set to which the rule belongs.

Managed object 410 may be identified as "PCC_GOLD," and may include entries 412, 414, 416. For example, entry 412 may indicate that a QCI of "6" should be used, entry 414 may indicate that a maximum bandwidth should of 512 kb in both directions should be used, and entry 416 may indicate that a charging parameter of $0.05 per kilobyte should be used. A managed object may include any number of entries; a managed object including three entries is used here only as an example.

Figure 5:
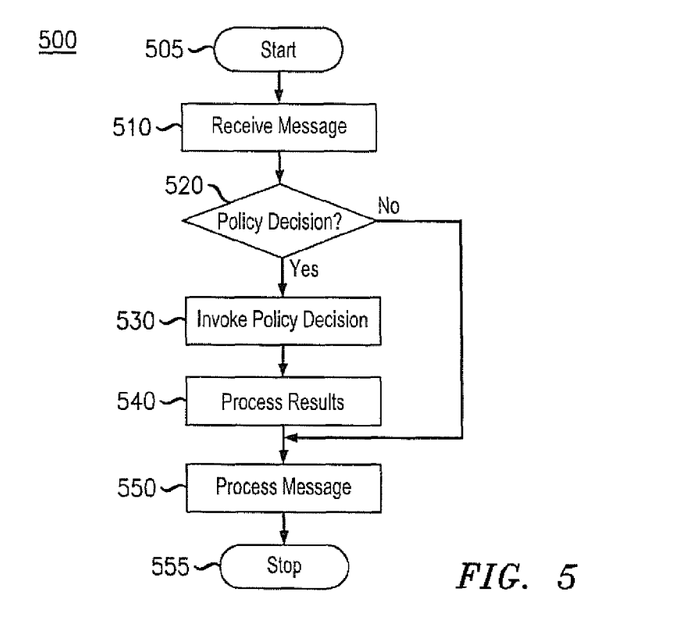
FIG. 5 illustrates an exemplary method for processing a received message in the embodiment shown in FIG. 2.

FIG. 5 illustrates an exemplary method 500 for processing a received message. Method 500 may be performed by the components of PCRN 136 such as, for example, message handler 220.

Method 500 may begin in step 505 and proceed to 510 where PCRN 136 may receive a message via Gxx interface 205, Gx interface 210, and/or Rx interface 215. Method 500 may then proceed to step 520, where PCRN 136 may determine whether a policy decision should be made in order to process the received message. If a policy decision is necessary, method 500 may proceed to step 530. Otherwise, method 500 may proceed to step 550.

At step 530, PCRN 136 may invoke a policy decision and await a policy decision result before continuing. In invoking a policy decision, message handler 220 may extract some information from the received message and pass it to context information module 225 or directly to rule matching engine 230. Alternatively, message handler 220 may pass the received message in its entirety to context information module 225 or directly to rule matching engine 230. Upon receiving a policy decision result, method 500 may proceed to step 540.

At step 540, PCRN 136 may process the received policy decision result. If the policy decision result includes a reference to a managed object, message handler 220 may retrieve the managed object from managed object storage 245 for interpretation. Method 500 may then proceed to step 550 where PCRN 136 may finish processing the received message in light of any received policy decision results. Step 550 may include, for example, creating a new PCC rule, establishing an IP-CAN session, and/or transmitting an acknowledgement message to another node. Method 500 may then end in step 555.

Figure 6:
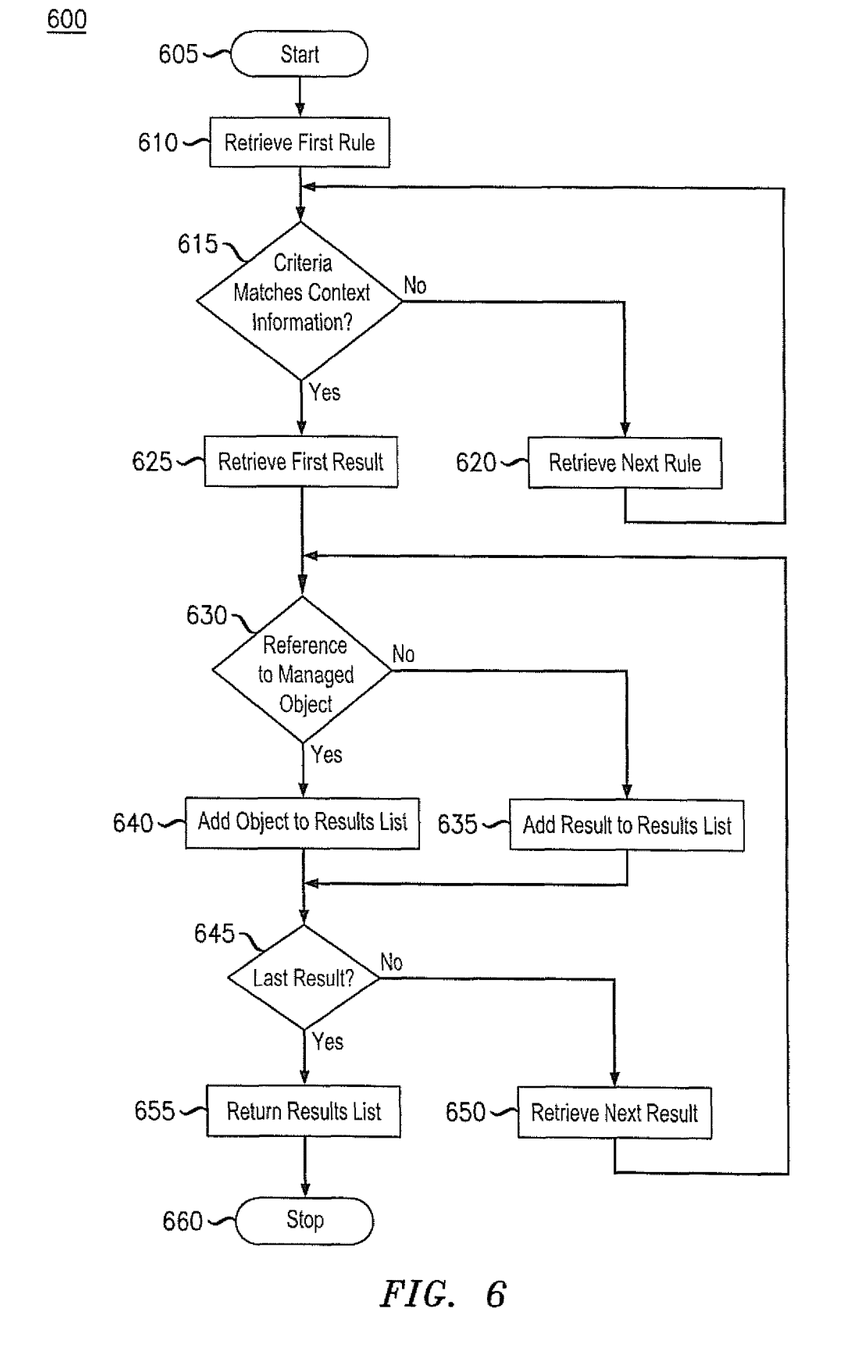
FIG. 6 illustrates an exemplary method for providing managed object support in the embodiment shown in FIG. 2.

FIG. 6 illustrates an exemplary method 600 for providing managed object support. Method 600 may be performed by the components of PCRN 136 such as, for example, rule matching engine 230 and/or result interpreter 240. Method 600 may correspond to step 530 (FIG. 5) or may be performed in parallel to method 500 after the execution of step 530.

Method 600 may begin in step 605 and proceed to step 610 where PCRN 136 may retrieve a first rule from the applicable rule set. PCRN 136 may determine the applicable rule set from context information stored in context information module 225 or message handler 220 may specify a rule set when invoking a policy decision. After retrieving a first rule, method 600 may proceed to step 615.

At step 615, PCRN 136 may compare the criteria portion of the rule to relevant context information passed by message handler 220 and/or context information module 225. If the criteria does not match the context information, method 600 may proceed to step 620 where PCRN 136 may retrieve the next rule from rule storage 230. Method 600 may then loop back to step 615.

If, on the other hand, PCRN 136 determines that the criteria section of a rule matches the context information at step 615, method 600 may proceed to step 625. At step 625, PCRN 136 may retrieve a first result from the result section of the matching rule. At step 630, PCRN 136 may then determine whether the result is a reference to a managed object. If the result is not a reference to a managed object, method 600 may proceed to step 635. At step 635, PCRN 136 may simply add the result to the policy decision result list.

If, at step 630, the PCRN 136 determines that the result is a reference to a managed object, method 600 may proceed to step 640 where the object is added to a policy decision result list. This may include retrieving the referenced object and inserting it into the policy decision result; retrieving the referenced object and inserting each entry into the policy decision result; or simply inserting the reference to the object in the policy decision result.

Method 600 may then proceed to step 645 where PCRN 136 may determine whether the result is the last result in the applicable rule. If there are additional results to process, PCRN 136 may retrieve the next result in step 650 and loop back to step 630. If, on the other hand, PCRN 136 determines that there are no more results to process, PCRN 136 may return the result list for further processing in step 655. Method 600 may then end in step 660.

Having described exemplary components and methods for the operation of exemplary subscriber network 100 and PCRN 136, an example of the operation of exemplary network 100 and PCRN 136 will now be provided with reference to FIGS. 1-6. PCRN 136 may correspond to PCRN 136. The contents of rule storage 235 may be indicated by data arrangement 300 and the contents of managed object storage 245 may be indicated by data arrangement 400.

The process may begin when PCRN 136 receives CCR 170 requesting the establishment of a new service data flow. Message handler 220 may extract information from the message, including a subscriber ID, and send the information to context information module 225. PCRN 136 then determines that a policy decision must be made and, at step 530, invokes a policy decision specifying that the PCC rule creation rule set should be used.

Rule matching engine then retrieves rule 312. Since the criteria section uses the subscriber_cat variable, rule matching engine 230 may request this information from context information module 225. Context information module, in turn, may retrieve the record associated with the subscriber ID from SPR 138 and determine that subscriber_cat is "gold." Rule matching engine 230 then determines that rule 312 is not applicable at step 615 because "gold" does not match "silver." Rule matching engine 230 then retrieves rule 314 at step 620. Since the criteria of rule 314 specifies that the rule is applicable when subscriber_cat is "gold," rule matching engine 230 determines that rule 314 is applicable and passes the rule to result interpreter 240.

Result interpreter 240 determines that "PCC_GOLD," as included in the results portion of rule 314, is a reference to a managed object in step 630. Result interpreter 240 then retrieves managed object 410 from managed object storage 245 and inserts entries 412, 414, 416 into the results list at step 640. Because rule 314 only includes one result (i.e., the reference to the PCC_GOLD managed object), result interpreter returns the result list in step 655. Message handler 220 may use the returned values for QCI, maximum bandwidth, and charging parameter to construct a new PCC rule and push it to PGW 134 in steps 540 and 550.

According to the foregoing, various exemplary embodiments provide for a flexible method of processing messages received at a PCRF. Particularly, by providing managed object support, a user may define managed objects to be used in determining the behavior of PCRN 136. Thereafter, managed objects may be modified to easily update the outcome of numerous rules which refer to the managed objects.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node for providing managed object support, the method comprising:
   determining, at a policy and charging rules node, that the policy and charging rules node should perform a policy decision;

comparing a criteria portion of at least one rule of a plurality of rules to a set of context information;
identifying a rule of the plurality of rules that matches the set of context information;
determining that a result portion of the identified rule includes a reference to a first managed object;
retrieving the first managed object based on the reference to the first managed object, wherein the first managed object is stored separately from the identified rule; and
using the first managed object as at least part of a result of the policy decision.

2. The method of claim 1, further comprising:
presenting a user with a first version of a managed object;
receiving, from the user, a second version of the managed object; and
storing the second version of the managed object, wherein a future reference to a managed object results in using the second version of the managed object as at least part of a result of a policy decision.

3. The method of claim 2, further comprising keeping the first version of the managed object as an old version of the managed object.

4. The method of claim 1, wherein the first managed object provides at least one of a specific value and a variable to be used as at least part of a result of the policy decision.

5. The method of claim 1, wherein the comparing comprises:
determining that the criteria portion includes a reference to a second managed object; and
comparing the second managed object to the set of context information.

6. The method of claim 1, further comprising:
receiving a message at the policy and charging rules node;
using at least a part of the message as at least a part of the set of context information; and
responding to the message based on the result of the policy decision.

7. The method of claim 1, wherein the using comprises including in the result of the policy decision a reference to the managed object.

8. A policy and charging rules node for providing managed object support, the policy and charging rules node comprising:
a rules storage configured to store a plurality of rules, wherein each rule includes a first portion and a second portion;
a managed object storage configured to store at least one managed object;
an interface configured to receive a message;
a message handler configured to:
determine that a policy decision should be generated, and
use a result of the policy decision to process the message;
a rule matching engine configured to:
compare the first portion of at least one rule of the plurality of rules with a set of context information, and
identify a rule from among the plurality of rules that matches the set of context information;
a result interpreter configured to:
determine that the second portion of the rule includes a reference to a managed object of the at least one managed object, and
indicate that the policy decision includes the managed object; and
wherein at least one of the result interpreter and the message handler is configured to retrieve the managed object based on the reference to the managed object from the managed object storage.

9. The policy and charging rules node of claim 8, wherein, the indicating comprises passing to the message handler, by the result interpreter, at least one of the managed object, a value of the managed object, and a reference to the managed object.

10. The policy and charging rules node of claim 8, further comprising:
a user interface configured to provide communication between a user and the policy and charging rules node; and
an object manager configured to:
receive a request for an existing version of a managed object having a name from the user via the user interface,
retrieve the existing version from the managed object storage,
forward the existing version to the user via the user interface,
receive a modified version of the managed object having the name from the user via the user interface, and
store the modified version in the managed object storage, wherein a future reference to the managed object having the name results in using the modified version.

11. The policy and charging rules node of claim 10, wherein the object manager further stores the existing version in the managed object storage as an old version of the managed object having the name.

12. The policy and charging rules node of claim 8, further comprising a context information module the tracks and stores context information, wherein the set of context information includes at least a portion of the context information stored in context information module.

13. The policy and charging rules node of claim 8, wherein the set of context information includes at least a portion of information carried by the message.

14. A non-transitory machine-readable storage medium encoded with instructions for execution on a policy and charging rules node for providing managed object support, the machine-readable storage medium comprising:
instructions for determining, at a policy and charging rules node, that the policy and charging rules node should perform a policy decision;
instructions for comparing a criteria portion of at least one rule of a plurality of rules to a set of context information;
instructions for identifying a rule of the plurality of rules that matches the set of context information;
instructions for determining that a result portion of the identified rule includes a reference to a first managed object;
instructions for retrieving the first managed object based on the reference to the first managed object, wherein the first managed object is stored separately from the identified rule; and
instructions for using the first managed object as at least part of a result of the policy decision.

15. The non-transitory machine-readable storage medium of claim 14, further comprising:
instructions for presenting a user with a first version of a managed object;

instructions for receiving, from the user, a second version of the managed object; and instructions for storing the second version of the managed object, wherein a future reference to a managed object results in using the second version of the managed object as at least part of a result of a policy decision.

16. The non-transitory machine-readable storage medium of claim 15, further comprising instructions for keeping the first version of the managed object as an old version of the managed object.

17. The non-transitory machine-readable storage medium of claim 14, wherein the first managed object provides at least one of a specific value and a variable to be used as at least part of a result of the policy decision.

18. The non-transitory machine-readable storage medium of claim 14, wherein the instructions for comparing comprise:

instructions for determining that the criteria portion includes a reference to a second managed object; and instructions for comparing the second managed object to the set of context information.

19. The non-transitory machine-readable storage medium of claim 14, further comprising:

instructions for receiving a message at the policy and charging rules node;

instructions for using at least a part of the message as at least a part of the set of context information; and instructions for responding to the message based on the result of the policy decision.

20. The non-transitory machine-readable storage medium of claim 14, wherein the instructions for using comprise instructions for including in the result of the policy decision a reference to the managed object.

* * * * *